US012658386B2

(12) United States Patent
Li

(10) Patent No.: US 12,658,386 B2
(45) Date of Patent: Jun. 16, 2026

(54) BREAK MECHANISM FOR SWITCHING APPARATUS AND SWITCHING APPARATUS

(71) Applicant: Schneider Electric (China) Co., Ltd., Beijing (CN)

(72) Inventor: Wenmei Li, Beijing (CN)

(73) Assignee: Schneider Electric (China) Co., Ltd., Beijing (CN)

( * ) Notice: Subject to any disclaimer, the term of this patent is extended or adjusted under 35 U.S.C. 154(b) by 247 days.

(21) Appl. No.: 18/521,832

(22) Filed: Nov. 28, 2023

(65) Prior Publication Data

US 2025/0087437 A1 Mar. 13, 2025

(30) Foreign Application Priority Data

Sep. 13, 2023 (CN) ......................... 202311179318.6

(51) Int. Cl.
*H01H 21/22* (2006.01)
*H01H 21/36* (2006.01)

(52) U.S. Cl.
CPC ............ *H01H 21/22* (2013.01); *H01H 21/36* (2013.01)

(58) Field of Classification Search
CPC ........ H01H 21/22; H01H 21/36; H01H 71/52; H01H 71/10; H01H 3/02; H01H 71/12; H01H 71/123
See application file for complete search history.

(56) References Cited

U.S. PATENT DOCUMENTS

2015/0235794 A1* 8/2015 Rakuff ................. H01H 50/645 335/171
2022/0122791 A1* 4/2022 Harrer .................. H01H 71/522

FOREIGN PATENT DOCUMENTS

EP 0143682 A1 6/1985
EP 1383150 A1 1/2004
FR 2940514 A1 6/2010

OTHER PUBLICATIONS

Extended European Search Report dated May 15, 2024 for corresponding European Patent Application No. 23211958.6-1201, 5 pages.

* cited by examiner

*Primary Examiner* — Lheiren Mae A Caroc
(74) *Attorney, Agent, or Firm* — FIG. 1 Patents

(57) ABSTRACT

A break mechanism for a switching apparatus is described that includes a contact driving assembly including a driving part and coupled to a moving contact to drive the moving contact to move between an open and a closed position; a handle assembly adapted to rotate around a pivot shaft and including a relevant driving part and a telescopic driving part keeping a length unchanged during a rotation of the handle assembly in a first rotation direction to drive the contact driving assembly to rotate in a second rotation direction, thereby driving the moving contact to move to the closed position; and an auxiliary assembly coupled to the relevant driving part, and adapted to move to a second position in a first movement direction during tripping of the switching apparatus, thereby causing the handle assembly to rotate in the second rotation direction.

10 Claims, 8 Drawing Sheets

BREAK MECHANISM FOR SWITCHING APPARATUS AND SWITCHING APPARATUS

FIELD

Embodiments of the present disclosure generally relate to the technical field of electronic equipment protection, and more specifically, to a break mechanism for a switching apparatus and a switching apparatus.

BACKGROUND

Switching apparatuses such as solid-state circuit breakers are a type of electrical protection device, which is used to disconnect current in a circuit to protect electrical equipment from damages of overload or short circuit. Solid-state circuit breakers are different from traditional mechanical circuit breakers in that they use semiconductor devices such as thyristors or power transistors to control the flow of current.

To provide reliable electrical isolation, a solid-state circuit breaker typically has a mechanical break point module. However, a traditional solid-state circuit breaker with a mechanical break module has three stable states, namely, a closed state, an open state, and a tripped state. In this case, after the solid-state circuit breaker is tripped, the rotary handle for controlling the opening and closing still stays in the closed position, and it is necessary to reset the rotary handle before re-closing after tripping, which has caused user operation inconvenience, thus affecting user experience and other issues.

SUMMARY

In a first aspect of the present disclosure, a break mechanism for a switching apparatus is provided. The break mechanism comprises a contact driving assembly, comprising a driven part and coupled to a moving contact to drive the moving contact to move between an open position and a closed position: a handle assembly adapted to rotate around a pivot shaft and comprising a relevant driving part and a telescopic driving part which is telescopic, the telescopic driving part adapted to be coupled with the driven part, and keeping a length unchanged during a rotation of the handle assembly in a first rotation direction to drive the contact driving assembly to rotate in a second rotation direction opposite to the first rotation direction, thereby driving the moving contact to move from the open position to the closed position, and the telescopic driving part adapted to retract during a rotation of the handle assembly in the second rotation direction to avoid the driven part; and an auxiliary assembly coupled to the relevant driving part, and adapted to move from a first position to a second position in a first movement direction during tripping of the switching apparatus, thereby causing the handle assembly to rotate in the second rotation direction.

In some embodiments, the contact driving assembly further comprises: a coupling part coupled to the moving contact to drive the moving contact; and a torsion spring adapted to provide an elastic force to allow the contact driving assembly to rotate in the first rotation direction.

In some embodiments, the relevant driving part is coupled to the auxiliary assembly so as to push the auxiliary assembly to move in the first movement direction during the rotation of the handle assembly in the second rotation direction.

In some embodiments, the contact driving assembly further comprises a stopped part, and wherein the auxiliary assembly further comprises a stop part, and the stop part is arranged so that during the auxiliary assembly being in the first position, the stop part is adapted to stop the stopped part to prevent the contact driving assembly from rotating in the first rotation direction.

In some embodiments, the contact driving assembly further comprises an interference part, and the handle assembly further comprises: a telescopic part adapted to contract when touching the interference part during the rotation of the handle assembly in the first rotation direction and to extend after continuing to rotate to a coupling position where the telescopic part is coupled with the interference part, wherein at the coupling position, the telescopic part is arranged to be stopped by the interference part to prevent the handle assembly from rotating in the second rotation direction.

In some embodiments, the break mechanism further comprises: an electromagnetic driving component comprising a push rod which is operable to push the auxiliary assembly to move to the second position in the first moving direction when tripping.

In some embodiments, the break mechanism further comprises: an elastic member coupled to the auxiliary assembly and adapted to provide an elastic force when the auxiliary assembly is in the second position, so as to allow the auxiliary assembly to move in a second moving direction opposite to the first moving direction.

In some embodiments, the stop part of the auxiliary assembly is arranged to be stopped by the interference part during the auxiliary assembly being in the second position, so as to prevent the auxiliary assembly from moving in the second moving direction.

In some embodiments, the break mechanism further comprises: a carrying component carrying the moving contact and hinged to the coupling part to drive the moving contact to move between the closed position and the open position under driving of the coupling part.

In some embodiments, the break mechanism further comprises: a compression spring arranged between the carrying component and the moving contact or between the fixed contact and the housing of the switching apparatus to provide a contact pressure at least during the moving contact being in the closed position.

The break mechanism according to embodiments of the present disclosure can make the handle assembly return to the open position after tripping of the switching apparatus, thus ensuring that the break mechanism has only two stable states, namely, an open state and a closed state. On the one hand, regardless of the situation (comprising after tripping), users only need one action to achieve opening or closing, making operation more convenient and reducing the possibility of mis-operation. On the other hand, the break mechanism according to embodiments of the present disclosure also makes the free tripping function more perfect, thus improving the reliability and user experience of the switching apparatus.

In a second aspect of the present disclosure, a switching apparatus is provided. The switching apparatus comprises a break mechanism according to the first aspect mentioned as above and an electronic break module coupled to the break mechanism.

It should be understood that the content described in this section is not intended to limit critical or important features of embodiments of the present disclosure, nor is it used to limit the scope of the present disclosure. Other features of the present disclosure will become easier to be understood through the following description.

BRIEF DESCRIPTION OF THE DRAWINGS

The above and other features, advantages, and aspects of each embodiment of the present disclosure will become more apparent in conjunction with the accompanying drawings and with reference to the following detailed explanations. In the accompanying drawings, the same or similar reference symbols represent the same or similar elements, where.

DETAILED DESCRIPTION

Figure 1:
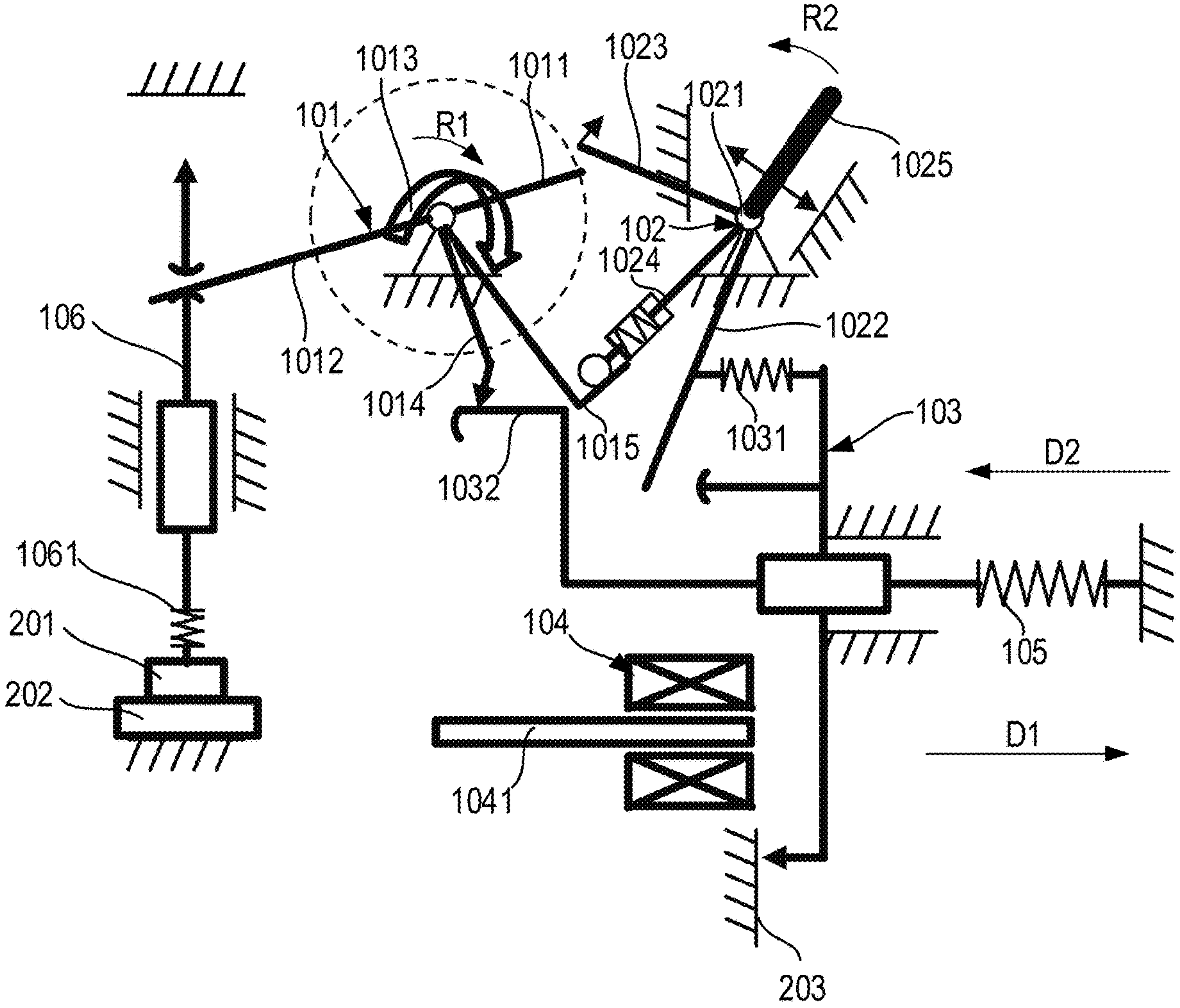
FIG. 1 shows a simplified schematic diagram of the break mechanism in the closed position according to embodiments of the present disclosure.

Embodiments of the present disclosure will be described in more detail below with reference to the accompanying drawings. Although certain embodiments of the disclosure are illustrated in the drawings, it should be understood that the present disclosure may be embodied in various forms and should not be construed as limited to the embodiments set forth herein, but rather, these embodiments are provided for a more thorough and complete understanding of the present disclosure. It should be understood that the drawings and embodiments of the present disclosure are for illustrative purposes only and are not intended to limit the scope of the present disclosure.

It should be noted that any section/subsection headings provided herein are not limiting. Various embodiments are described throughout herein, and any type of embodiment may be included under any section/subsection. Furthermore, embodiments described in any section/subsection may be combined in any manner with any other embodiments described in the same section/subsection and/or in a different section/subsection.

The term "comprise" and its variants used herein indicate open inclusion, that is, "comprising but not limited to". The term "based on" should be interpreted as "based at least in part on". The terms "an exemplary embodiment" and "an embodiment" should be interpreted as "at least one exemplary embodiment". The term "some embodiments" should be interpreted as "at least some embodiments". Other explicit and implicit definitions may be included below. The terms "first", "second", etc., may refer to different or the same object. Other explicit and implicit definitions may also be included below.

A circuit breaker is a key component in power transmission and distribution lines that connects and disconnects loads. Its main function is to protect the circuit from abnormal currents caused by faults and overloads, and to quickly cut off faulty branches in the event of a system malfunction. Traditional mechanical circuit breakers protect the circuit by triggering mechanical contact separation through thermal bimetallic and/or magnetic assemblies, but their response time to faults is relatively long and they are prone to arcing, which increases the risk of equipment damage and personal safety. With the rapid development of power semiconductor technology, replacing mechanical contacts with high-power solid-state contactless switches has become a research hotspot, and solid-state circuit breaker technology has rapidly developed.

Solid-state circuit breakers disconnect or connect circuits by controlling semiconductor switches. They can quickly respond to current anomalies and quickly cut off circuits when needed to prevent damage to electrical equipment or fires. Compared to traditional mechanical circuit breakers, solid-state circuit breakers have many advantages, comprising faster action time, higher accuracy, smaller volume, longer lifespan, and lower maintenance costs. Solid-state circuit breakers are typically used in applications that require high-precision current protection and frequent switching, such as industrial automation systems, power distribution, motor control, and renewable energy systems.

Solid-state circuit breakers can be divided into full solid-state circuit breakers and hybrid solid-state circuit breakers. Hybrid solid-state circuit breakers are circuit breakers that use mechanical breaks (also known as mechanical switches) and electronic breaks (such as power semiconductor devices). When the hybrid solid-state circuit breaker is closed from an open state, the mechanical break is first closed. At this time, there is no current flowing through the circuit, and then, the electronic break is closed, and the current flows through the circuit to complete the closing process. When opening the hybrid solid-state circuit breaker, the electronic break is first opened, and the mechanical break is opened after no current flows through the circuit, thus completing the opening process. Mechanical breaks can achieve effective electrical isolation, thereby improving the reliability of solid-state circuit breakers.

However, traditional hybrid solid-state circuit breakers still have some problems in use, which affect the user experience. For example, current hybrid solid-state circuit breakers typically have three stable states, namely a closed state, an open state, and a tripped state. After the current solid-state circuit breaker is tripped, the rotary handle used to control opening and closing is usually still in the closed position. This makes it necessary to reset the rotary handle before re-closing the circuit breaker after tripping, which brings inconvenience to operation. In addition, the free tripping function in traditional solid-state circuit breakers is not perfect enough. These all affect the user experience.

Embodiments of the present disclosure provides a break mechanism for a switching apparatus such as a solid-state circuit breaker to solve or at least partially solve the above problems or other potential problems existing in traditional switching apparatus. The concept according to the present disclosure will be described below, taking the break mechanism as a mechanical break of a solid-state circuit breaker as an example. It should be understood that the same is true for other types of switching apparatus with similar mechanisms, which will not be described separately below.

The scheme of the break mechanism of the switching apparatus will be described below mainly through the accompanying drawings. It should be understood that the disclosed drawings are only a simplified schematic diagram and are not intended to limit the scope of the present disclosure. The length and shape of the lines in the drawings, as well as the positional relationship between the lines, are only shown for convenience in describing the implementation of the present disclosure. As long as the functions described herein can be achieved, they can have any appropriate shapes, structures, or positional relationships in actual solutions. In addition, the fixed components in the drawings of the present disclosure represent appropriate structures of the housing or in the housing of the switching apparatus and/or break mechanism, which will not be described separately below.

Figure 2:
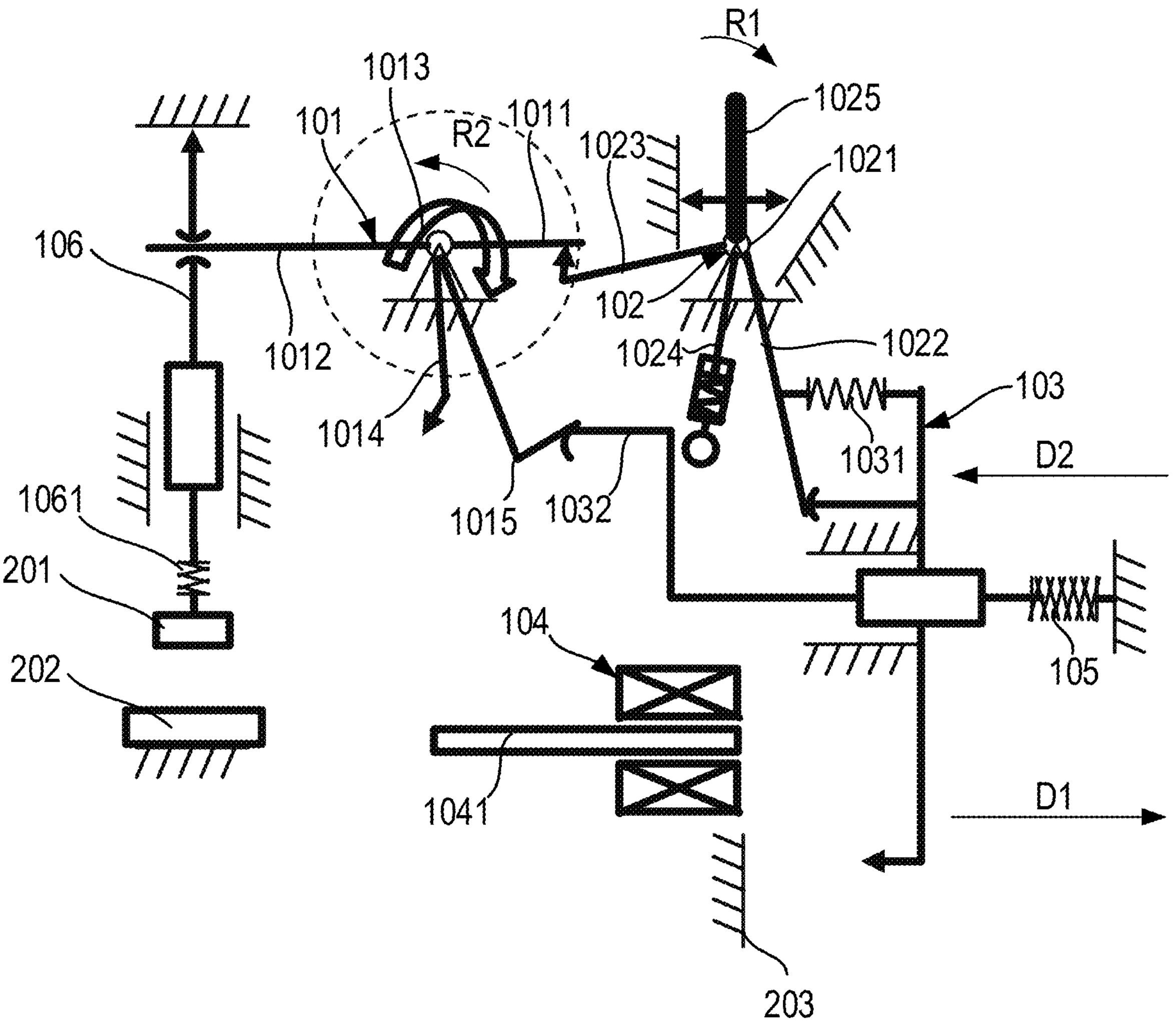
FIG. 2 shows a simplified schematic diagram of the break mechanism in the open position according to embodiments of the present disclosure.

FIG. 1 shows a schematic diagram of the position of each assembly or component when the break mechanism is in a closed state according to embodiments of the present disclosure, and FIG. 2 shows the schematic diagram of the position of each assembly or component when the break mechanism is in an open position. As shown in FIGS. 1 and 2, in general, the break mechanism according to embodiments of the present disclosure comprises a contact driving assembly 101, a handle assembly 102, and an auxiliary assembly 103. In some embodiments, the break mechanism may also comprise an electromagnetic driving component 104 with a push rod 1041, which will be further described below.

In response to an action of the handle assembly 102 and/or the electromagnetic driving component 104, the contact driving assembly 101 is used to drive the moving contact 201 to move between an open position and a closed position. The contact driving assembly 101 is coupled to the moving contact 201 and comprises a driven part 1011. The handle assembly 102 is adapted to rotate around a pivot shaft 1021 in response to the user's operation and/or the action of some components (such as a tension spring 1031) to be mentioned below. For example, in some embodiments, the handle assembly 102 may comprise a handle 1025 located outside the housing, which can be operated by a user to rotate between the closed position and the open position.

Figure 3A:
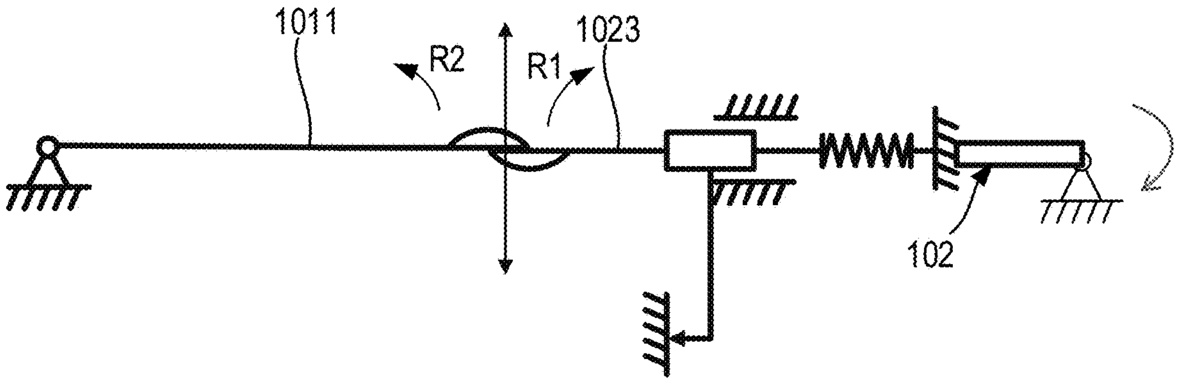
FIGS. 3A to 3D respectively show the partial schematic diagram of the structure of the telescopic driving part of the handle assembly and the driven part of the contact driving assembly according to some embodiments of the present disclosure.
Figure 3B:
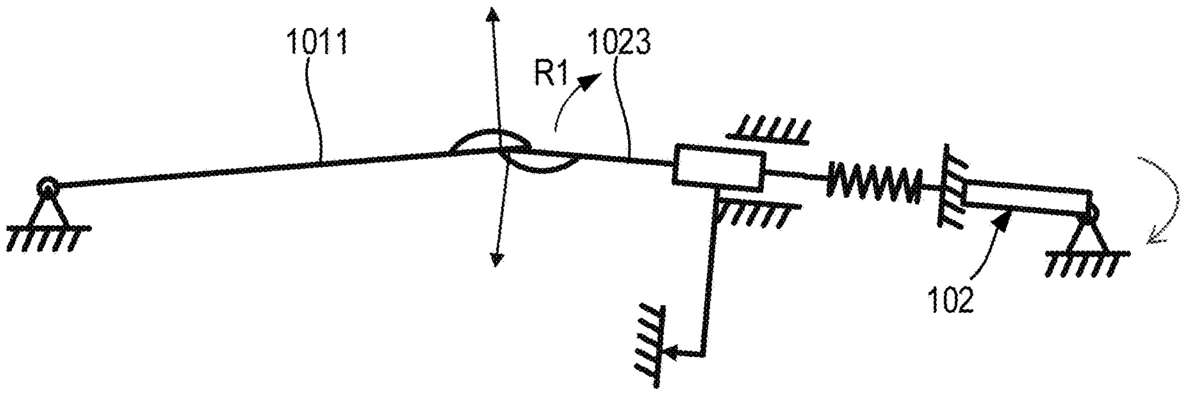

The handle assembly 102 further comprises a telescopic driving part 1023 which is telescopic. The telescopic driving part 1023 can be coupled with the driven part 1011 of the contact driving assembly 101, so that the contact driving assembly 101 can drive the moving contact 201 to move between the closed position and the open position in response to the position change of the handle assembly 102. FIGS. 3A to 3D show partial schematic diagrams of the structure of the telescopic driving part 1023 of the handle assembly 102 and the driven part 1011 of the contact driving assembly 101. As shown in FIGS. 3A and 3B, the telescopic driving part 1023 can keep the length unchanged in response to the rotation of the handle assembly 102 in a first rotation direction R1 (e.g., a clockwise direction), so as to drive the driven part 1011 of the contact driving assembly 101 to rotate in a second rotation direction R2 (e.g., a counterclockwise direction) opposite to the first rotation direction R1, thereby driving the moving contact 201 to move from the open position to the closed position.

Figure 3C:
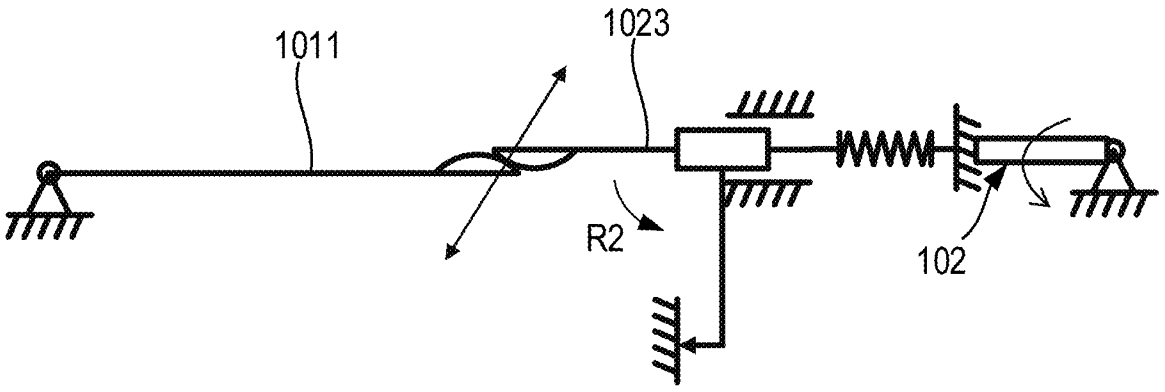
Figure 3D:
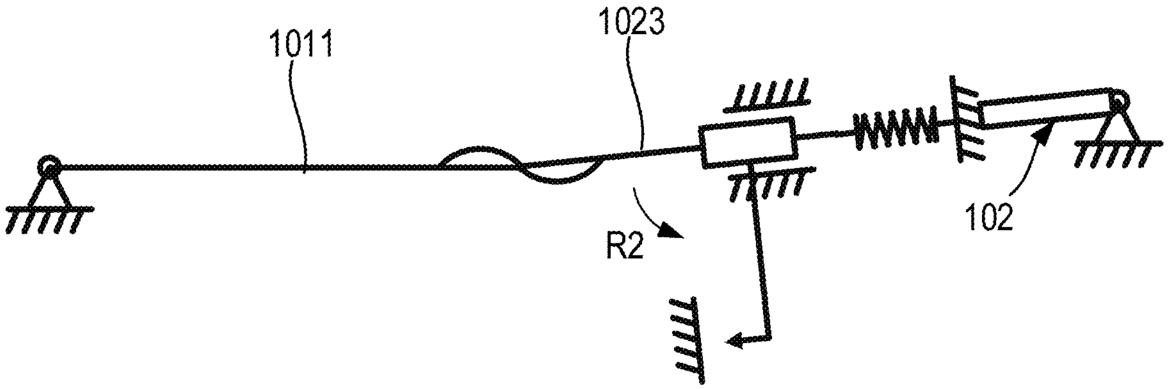

FIGS. 3C and 3D show the partial schematic diagrams of the structure of the telescopic driving part 1023 of the handle assembly 102 and the driven part 1011 of the contact driving assembly 101 during automatic reset process of the handle assembly 102 to the open position after tripping. Specifically, after tripping, during the rotation of the handle assembly 102 in the second rotation direction R2 (e.g., a counterclockwise direction), the telescopic driving part 1023 can retract (that is, shorten or shrink) to avoid the driven part 1011, thus allowing the handle assembly 102 to be reset to the open position. Here, the mutual coupling process of the telescopic driving part 1023 of the handle assembly 102 and the driven part 1011 of the contact driving assembly 101 is described only through simple examples and partial views. The process of how the break mechanism performs opening, closing and tripping will be further explained below.

The handle assembly 102 further comprises a relevant driving part 1022. The auxiliary assembly 103 is coupled to the relevant driving part 1022 through a tension spring 1031. During the tripping process of the switching apparatus, the auxiliary assembly 103 can move from the first position to the second position along the first movement direction D1 (e.g., the direction from left to right shown in the figure), and cause the handle assembly 102 to rotate to the open position in the second rotation direction R2.

To facilitate the movement of the auxiliary assembly 103, a sliding guide member or structure is included in the housing. The auxiliary assembly 103 can be coupled to the sliding guide member or structure to facilitate movement of the auxiliary assembly 103 in the first movement direction D1 and the second movement direction D2 opposite thereto. It should be understood that as long as the above-mentioned sliding function of the auxiliary assembly 103 can be realized, any suitable sliding guide component or structure is possible, which is not limited herein.

The break mechanism according to embodiments of the present disclosure can make the handle assembly 102 of the switching apparatus return to the open position after tripping, thus ensuring that the break mechanism has only two stable states, namely, the open state and the closed state. On the one hand, regardless of the situation (comprising after tripping), users only need one action to achieve opening or closing, making operation more convenient and reducing the possibility of mis-operation. On the other hand, the break mechanism according to embodiments of the present disclosure also makes the free tripping function more perfect, thus improving the reliability and user experience of the switching apparatus.

In some embodiments, the contact driving assembly 101 further comprises a coupling part 1012 and a torsion spring 1013. The coupling part 1012 can be coupled to the moving contact 201 to drive the moving contact 201 to move. To facilitate the coupling between the contact driving assembly 101 and the moving contact 201, in some embodiments, the break mechanism may also comprise a carrying component 106 for carrying the moving contact 201. The carrying component 106 is hinged to the coupling part 1012 of the contact driving assembly 101 to drive the moving contact 201 to move between the closed position and the open position under the drive of the coupling part 1012. In some embodiments, the housing of the break mechanism further comprises an appropriate sliding guide component or structure, so that at least part of the carrying component slides along the sliding guide component or structure, thus making the movement of the moving contact 201 between the closed position and the open position more reliable and smooth.

In some embodiments, the break mechanism further comprises a compression spring 1061 arranged between the carrying component 106 and the moving contact 201. The compression spring 1061 can provide a contact pressure at least when the moving contact 201 is in the closed position.

On the one hand, the contact pressure can ensure that moving contact 201 and fixed contact 202 maintain good contact during the closed position. On the other hand, the contact pressure can also promote the separation of the moving contact 201 from a fixed contact 202 in the case of opening operation or tripping, thus improving the electrical performance of the switching apparatus.

The torsion spring 1013 in the contact driving assembly 101 can provide elastic force to make the contact driving assembly 101 rotate in the first rotation direction R1 (i.e., drive the moving contact 201 to move to the open position). The torsion spring 1013 can provide driving force in the case of opening operation and tripping to drive the moving contact 201 to move to the open position and to be separated from the fixed contact 202 to complete opening.

In some embodiments, the contact driving assembly 101 further comprises an interference part 1015. Correspondingly, the handle assembly 102 further comprises a telescopic part 1024. The telescopic part 1024 can contract by touching the interference part 1015 during the rotation of the handle assembly 102 in the first rotation direction R1 (e.g., the clockwise direction for closing operation). As the handle assembly 102 continues to rotate in the first rotation direction R1, the telescopic part 1024 stretches after rotating to the coupling position where the telescopic part 1024 is coupled with the interference part 1015, so that the telescopic part 1024 can be stopped by the interference part 1015 at the coupling position, to prevent the handle assembly 102 from rotating in the second rotation direction R2, so that the handle assembly 102 is kept in the closed position.

In some embodiments, the telescopic part 1024 may have a spherical surface or similar curved surface shape at the end, and a compression spring component at the middle, so that it can realize contraction when touching, and extend again with further movement, and be stopped by the interference part 1015 at the coupling position.

In some embodiments, the auxiliary assembly 103 further comprises a stop part 1032. Correspondingly, the contact driving assembly 101 further comprises a stopped part 1014. The stop part 1032 is arranged so that when the auxiliary assembly 103 is in the first position (corresponding to the period when the moving contact 201 is in the closed position), the stop part 1032 can stop the stopped part 1014 to prevent the contact driving assembly 101 from rotating to the open position in the first rotation direction R1 (e.g., the clockwise direction).

In some embodiments, the relevant driving part 1022 of the handle assembly 102 is also coupled to the auxiliary assembly 103 to push the auxiliary assembly 103 to move along the first movement direction D1 during the rotation of the handle assembly 102 in the second rotation direction R2 (e.g., the counterclockwise direction moving to the open position), so that the auxiliary assembly 103 can move to the second position (corresponding to the moving contact 201 being in the open position). This is the driven situation of auxiliary assembly 103 during manual opening process.

The auxiliary assembly 103 can also realize the movement along the first movement direction D1 to the second position under the drive of the electromagnetic driving component 104, which is the driven situation of the auxiliary assembly 103 in the electric opening process (that is, the tripping process). The electromagnetic driving component 104 comprises a tripping coil and a push rod 1041. The tripping coil can, when it is powered on (that is, when tripping is required), push the push rod 1041 from an initial position to move along the first moving direction D1 so as to push the auxiliary assembly 103 to move to the second position along the first moving direction D1. The push rod 1041 can return to the initial position after the tripping coil loses power.

In some embodiments, the break mechanism further comprises an elastic member 105 arranged between the auxiliary assembly 103 and the housing. The elastic member 105 can provide elastic force when the auxiliary assembly 103 is in the second position, so that the auxiliary assembly 103 has a tendency to move along the second movement direction D2 (that is, the direction from right to left in the figure) opposite to the first movement direction D1. In some embodiments, the elastic member 105 may be a compression spring coupled to the auxiliary assembly 103. For example, the compression spring can provide compression force at least when the auxiliary assembly 103 is in the second position, so that the auxiliary assembly 103 has a tendency to move along the second movement direction D2, and can move the auxiliary assembly 103 along the second movement direction D2 at an appropriate time.

In some alternative embodiments, the elastic member 105 may also be a tension spring. The tension spring is arranged at an appropriate position between the auxiliary assembly 103 and the housing, and can provide a tensile force at least when the auxiliary assembly 103 is in the second position, so that the auxiliary assembly 103 has a tendency to move in the second movement direction D2, and can move the auxiliary assembly 103 in the second movement direction D2 at an appropriate time.

In some embodiments, the stop part 1032 of the auxiliary assembly 103 is arranged to be stopped by the interference part 1015 of the contact driving assembly 101 during the auxiliary assembly 103 being in the second position, so as to prevent the auxiliary assembly 103 from moving along the second movement direction D2. In addition, in some embodiments, the break mechanism may also comprise a limiting member 203. The limiting part 203 can stop the auxiliary assembly 103 after the auxiliary assembly 103 is moved to the first position along the second moving direction D2, so as to keep the auxiliary assembly 103 in an appropriate position.

Figure 4:
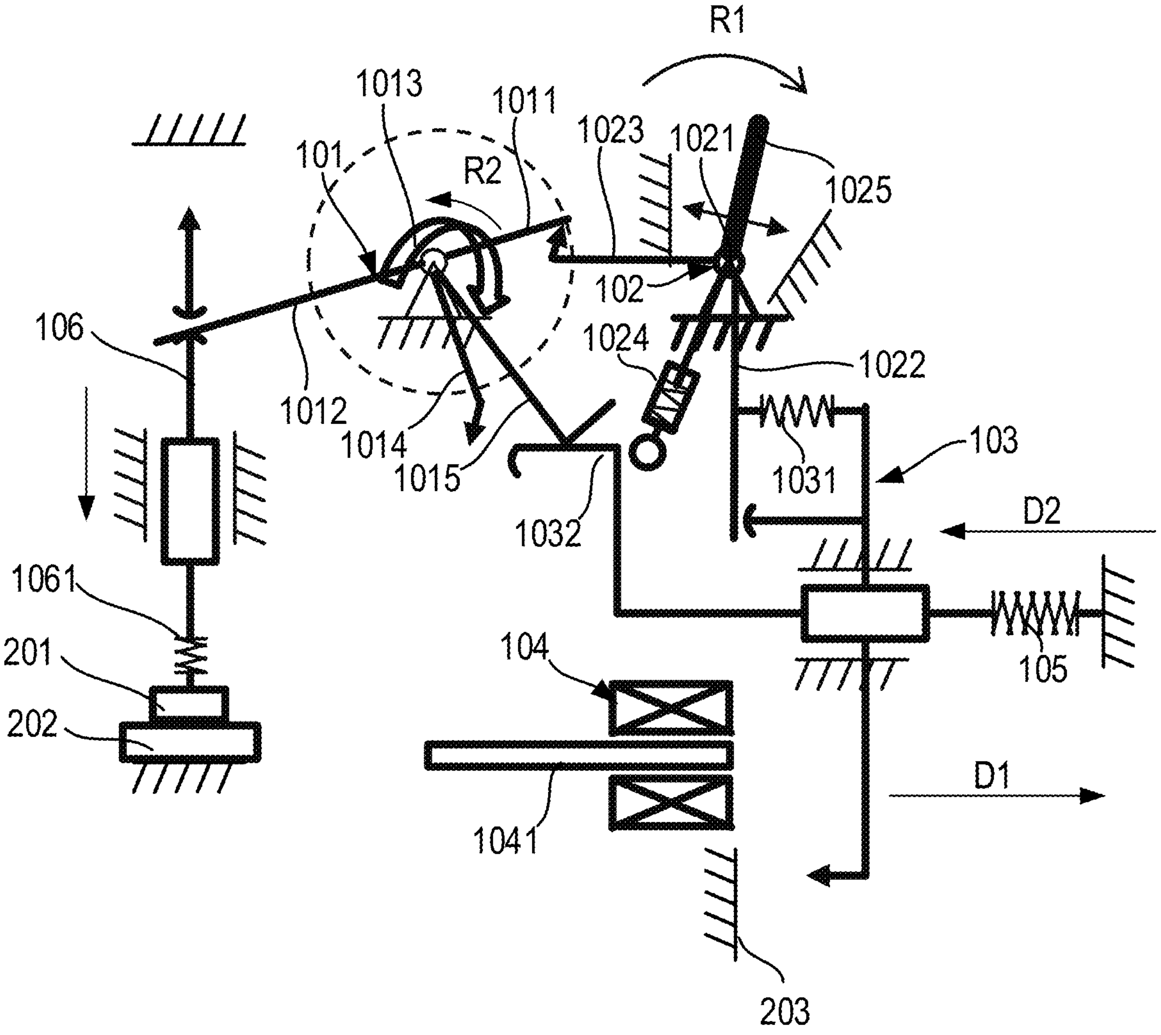
FIG. 4 shows a simplified schematic diagram of the break mechanism during manual closing according to some embodiments of the present disclosure.

The operation process of the break mechanism according to embodiments of the present disclosure will be further described below in combination with FIGS. 4 to 7. FIG. 4 shows a schematic diagram of an intermediate state where the break mechanism moves from the open state shown in FIG. 2 to the closed state shown in FIG. 1 through the manual closing operation of the handle assembly 102.

In the manual closing process, during the rotation of the handle assembly 102 in a clockwise direction (that is, the first rotation direction R1 in the preceding text) in response to the user's closing operation, the contact driving assembly 101 is rotated in a counterclockwise direction (that is, the second rotation direction R2 in the preceding text) through the contact and coupling between the telescopic driving part 1023 of the handle assembly 102 and the driven part 1011 of the contact driving assembly 101. During this process, the carrying component 106 moves downward in the direction shown in the figure. At the same time, the relevant driving part 1022 of the handle assembly 102 is separated from the auxiliary assembly 103. The auxiliary assembly 103 moves along the second moving direction D2 (that is, from right to left in the figure) under the action of the elastic member 105 (such as a compression spring) and the tension spring 1031.

The handle assembly 102 continues to rotate, and during the movement of the auxiliary assembly 103, its stop part 1032 successively contacts the interference part 1015 and the stopped part 1014 of the contact driving assembly 101.

When the handle assembly 102 is rotated to the closed position, as shown in FIG. 1, the telescopic driving part 1023 of the handle assembly 102 contacts and then separates from the driven part 1011, and the contact driving assembly 101 is rotated clockwise under the action of the torsion spring 1013 to the position where the rotation of the stopped part 1014 of the contact driving assembly 101 is limited by the stop part 1032 of the auxiliary assembly 103. The telescopic part 1024 of the handle assembly 102 moves to the coupling position and is constrained by the interference part 1015 of the contact driving assembly 101 and the housing to reach a balanced state, thus achieving a stable closed state as shown in FIG. 1.

Figure 5:
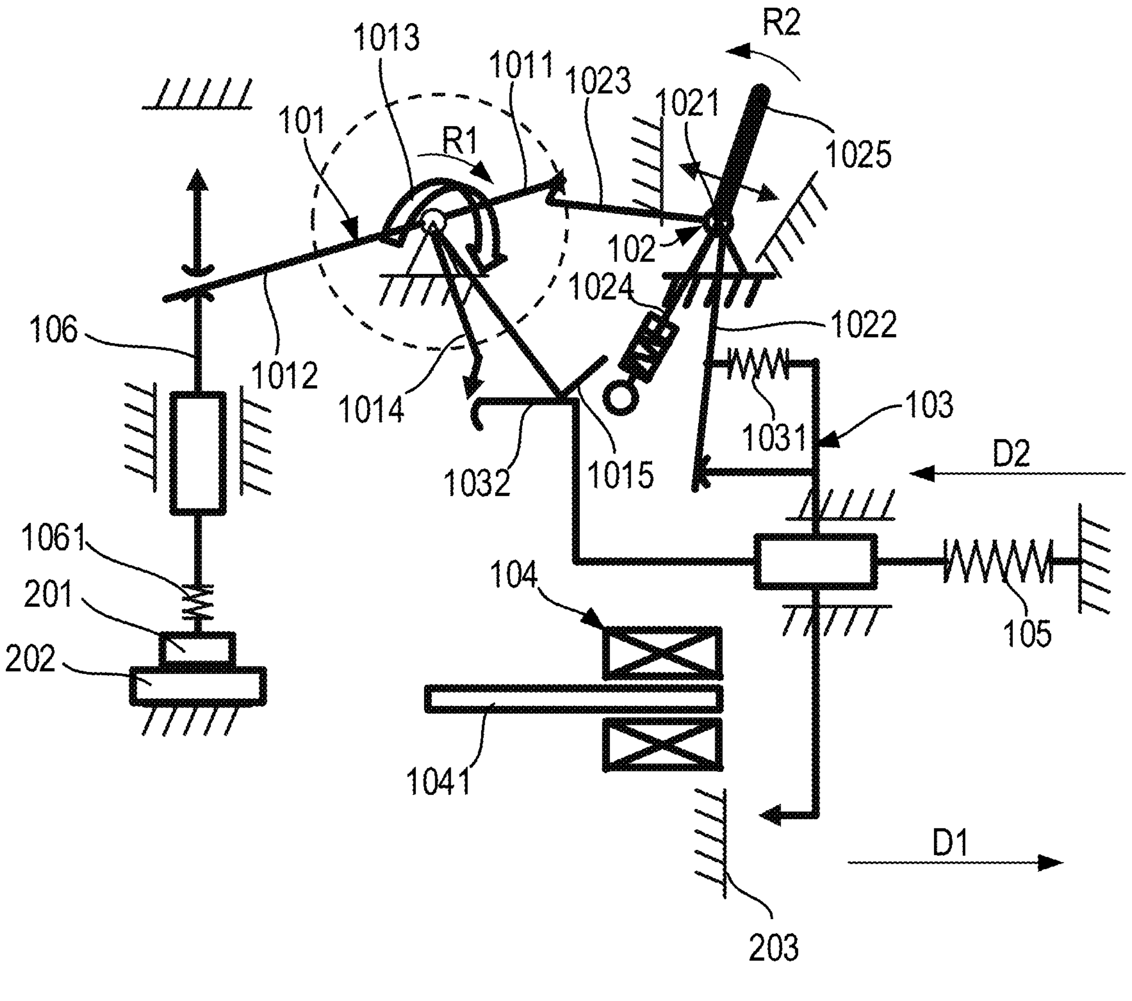
FIG. 5 shows a simplified schematic diagram of the break mechanism during manual opening according to some embodiments of the present disclosure.

FIG. 5 shows a schematic diagram of an intermediate state in which the break mechanism moves from the closed state shown in FIG. 1 to the open state shown in FIG. 2 by manually opening the handle assembly 102. As shown in FIG. 5, during the rotation of the handle assembly 102 in a counterclockwise direction (i.e., the second rotation direction R2 in the preceding text) in response to the user's opening operation, the handle assembly 102 will push the auxiliary assembly 103 to move in the first movement direction D1 (i.e., the direction from left to right in the figure) through the relevant driving part 1022 until the stopped part 1014 and the interference part 1015 of the contact driving assembly 101 are successively separated from the stop part 1032 of the auxiliary assembly. The contact driving assembly 101 is rotated clockwise under the action of the torsion spring 1013 to open the moving contact 201, reaching a stable open state as shown in FIG. 2.

Figure 6:
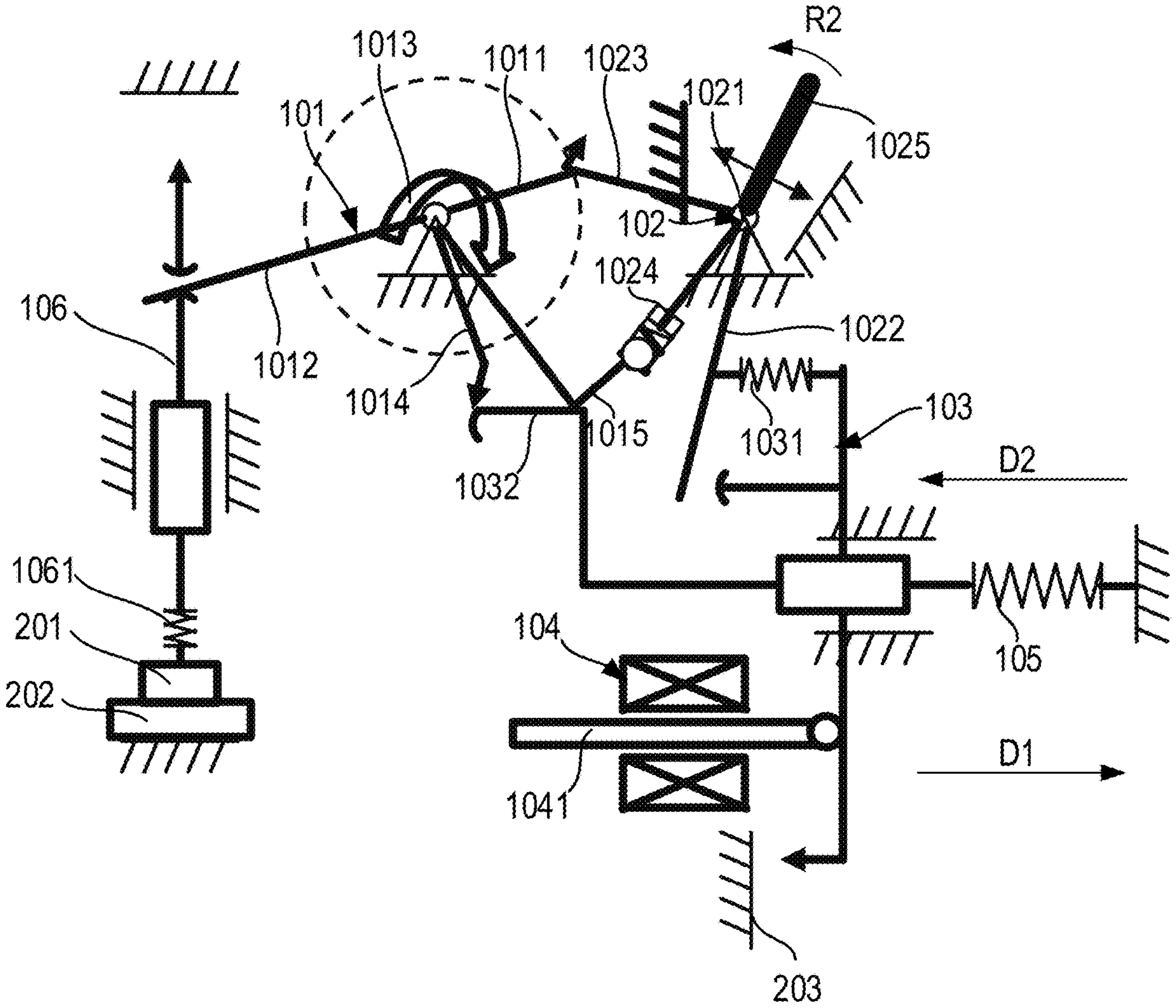
FIG. 6 shows a simplified schematic diagram of the break mechanism during electric opening according to some embodiments of the present disclosure.

FIG. 6 shows a schematic diagram of an intermediate state in which the break mechanism moves from the closed state shown in FIG. 1 to the open state shown in FIG. 2 through the electric opening operation (i.e., tripping operation) of the electromagnetic driving component 104. As shown in FIG. 6, in a case where the tripping condition is met, the electromagnetic driving component 104 is triggered, and the push rod 1041 pushes against the auxiliary assembly 103 along the first movement direction D1 (that is, the direction from left to right as shown in the figure), so that the auxiliary assembly 103 moves along the first movement direction D1. At the same time, the auxiliary assembly 103 drives the handle assembly 102 to rotate counterclockwise (that is, the second rotation direction R2 mentioned above) through the tension spring 1031. When the auxiliary assembly 103 is pushed to a predetermined position by the push rod 1041, the handle assembly 102 is also rotated to the open position. During this process, the stopped part 1014 and the interference part 1015 of the contact driving assembly 101 successively disengage from the stop part 1032 of the auxiliary assembly 103. When the stopped part 1014 and the interference part 1015 both disengage from the stop part 1032 of the auxiliary assembly 103, the contact driving assembly will rotate clockwise under the action of the torsion spring 1013, which drives the moving contact 201 to the open position until the carrying component 106 is limited by the housing, so as to reach the stable open state shown in FIG. 2.

It can be seen from this process that, as mentioned above, even in the case of electric opening operation (i.e. tripping operation), the handle assembly 102 can move to the open position, making the break mechanism only have two stable states, namely, an open state and a closed state. In this way, the user can make the switching apparatus close or open only by performing one action, which reduces the risk of misoperation and improves the reliability.

Figure 7:
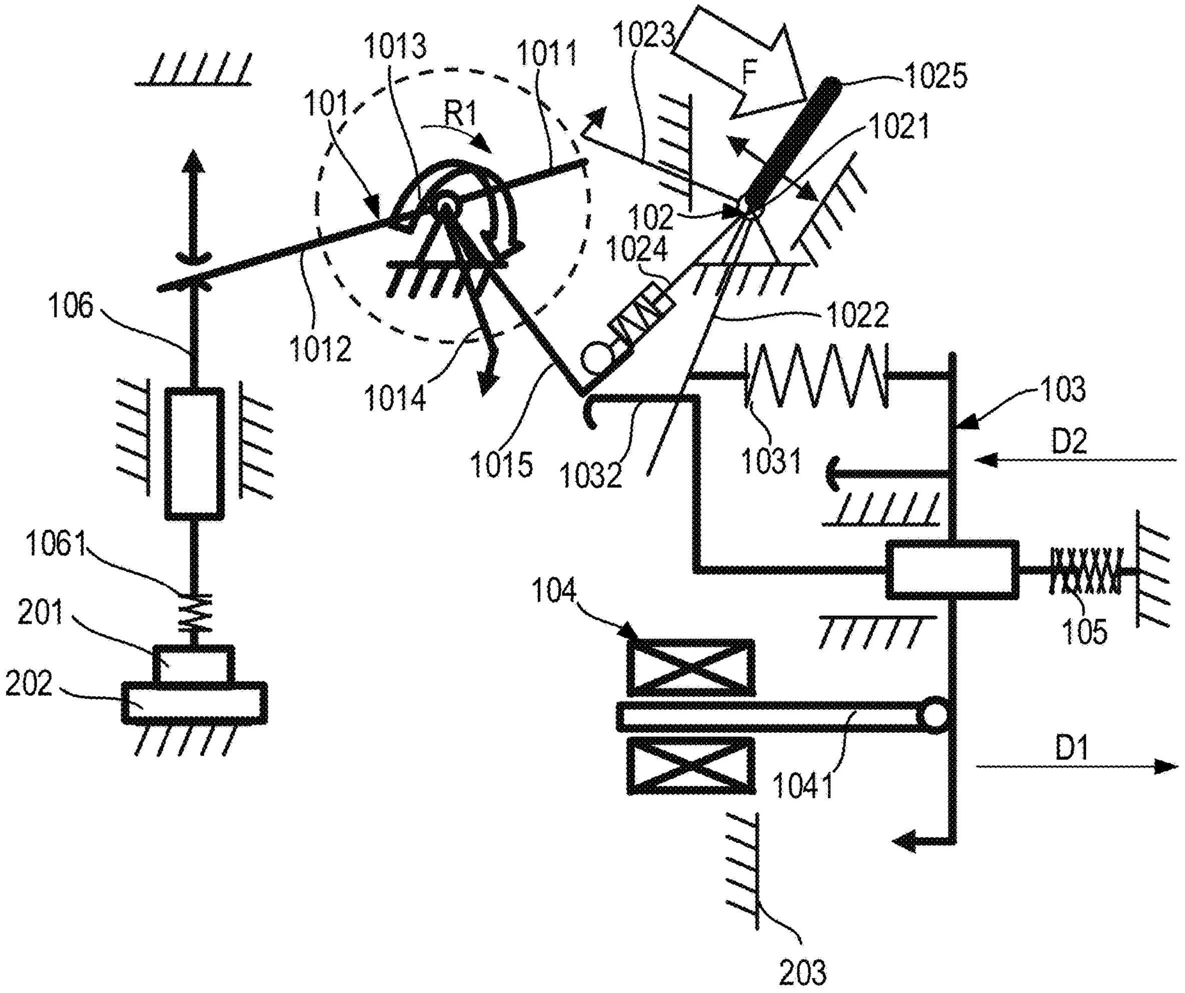
FIG. 7 shows a simplified schematic diagram of the break mechanism during free tripping according to some embodiments of the present disclosure.

FIG. 7 shows the intermediate process of free tripping of the break mechanism according to embodiments of the present disclosure. As shown in FIG. 7, according to the requirement of free tripping, the user keeps a closing force F on the handle 1025 of the handle assembly 102. At this time, the electromagnetic driving component 104 is triggered, pushing the auxiliary assembly 103 along the first movement direction D1 (that is, from left to right as shown in the figure) until the stopped part 1014 and the interference part 1015 of the contact driving assembly 101 successively disengage from the stop part 1032 of the auxiliary assembly 103, the contact driving assembly 101 is rotated clockwise under the action of the torsion spring 1013, and the moving contact 201 is driven to the open position. After the electromagnetic driving component 104 loses power, the push rod 1041 returns to the initial position on the left side, and the auxiliary assembly 103 moves along the second moving direction D2 (that is, the direction from right to left in the figure) under the action of the elastic member 105 (e.g., a compression spring) until the stop part 1032 of the auxiliary assembly 103 is stopped by the interference part 1015 of the contact driving assembly 101 and stops moving. When the closing force F is removed from the handle 1025, the handle assembly 102 is driven to the open position under the action of the tension spring 1031, and returns to the stable open state shown in FIG. 2.

Various embodiments of the present disclosure have been described above, which are exemplary, not exhaustive, and are not limited to the disclosed embodiments. Without deviating from the scope and spirit of the various embodiments explained, many modifications and changes are apparent for those skilled in the art. The selection of terms used herein is intended to best explain the principles, practical applications, or technological improvements in the market of each embodiment, or to enable those skilled in the art to understand the disclosed embodiments.

What is claimed is:

1. A break mechanism for a switching apparatus, comprising:

a contact driving assembly comprising a driven part and coupled to a moving contact to drive the moving contact to move between an open position and a closed position;

a handle assembly adapted to rotate around a pivot shaft and comprising a relevant driving part and a telescopic driving part which is telescopic, the telescopic driving part adapted to be coupled with the driven part, and keeping a length unchanged during a rotation of the handle assembly in a first rotation direction to drive the contact driving assembly to rotate in a second rotation direction opposite to the first rotation direction, thereby driving the moving contact to move from the open position to the closed position, and the telescopic driving part being adapted to retract during a rotation of the handle assembly in the second rotation direction to avoid the driven part; and an auxiliary assembly coupled to the relevant driving part, and adapted to move from a first position to a second position in a first movement direction during tripping of the switching apparatus, thereby causing the handle assembly to rotate in the second rotation direction.

2. The break mechanism of claim 1, wherein the contact driving assembly further comprises:

a coupling part coupled to the moving contact to drive the moving contact; and a torsion spring adapted to provide an elastic force to allow the contact driving assembly to rotate in the first rotation direction.

3. The break mechanism of claim 2, further comprising:

a carrying component carrying the moving contact and hinged to the coupling part to drive the moving contact to move between the closed position and the open position under driving of the coupling part.

4. The break mechanism of claim 3, further comprising:

a compression spring arranged to provide a contact pressure at least during the moving contact being in the closed position.

5. The break mechanism of claim 1, wherein the relevant driving part is coupled to the auxiliary assembly so as to push the auxiliary assembly to move in the first movement direction during the rotation of the handle assembly in the second rotation direction.

6. The break mechanism of claim 1, wherein the contact driving assembly further comprises a stopped part, and wherein the auxiliary assembly further comprises a stop part, and the stop part is arranged so that, during the auxiliary assembly being in the first position, the stop part is adapted to stop the stopped part to prevent the contact driving assembly from rotating in the first rotation direction.

7. The break mechanism of claim 6, wherein the contact driving assembly further comprises an interference part, and the handle assembly further comprises:

a telescopic part adapted to contract when touching the interference part during the rotation of the handle assembly in the first rotation direction and to extend after continuing to rotate to a coupling position where the telescopic part is coupled with the interference part, wherein at the coupling position, the telescopic part is arranged to be stopped by the interference part to prevent the handle assembly from rotating in the second rotation direction.

8. The break mechanism of claim 7, further comprising:

an elastic member coupled to the auxiliary assembly and adapted to provide an elastic force when the auxiliary assembly is in the second position, so as to allow the auxiliary assembly to move in a second movement direction opposite to the first movement direction.

9. The break mechanism of claim 8, wherein the stop part of the auxiliary assembly is arranged to be stopped by the interference part during the auxiliary assembly being in the second position, so as to prevent the auxiliary assembly from moving in the second movement direction.

10. The break mechanism of claim 1, further comprising:

an electromagnetic driving component comprising a push rod which is operable to push the auxiliary assembly to move to the second position in the first movement direction when tripping.

* * * * *